US008179755B2

(12) United States Patent
Harris

(10) Patent No.: US 8,179,755 B2

(45) Date of Patent: May 15, 2012

(54) ADAPTIVE HIGH FIDELITY REPRODUCTION SYSTEM

(75) Inventor: Scott C. Harris, Rancho Santa Fe, CA (US)

(73) Assignee: Illinois Computer Research, LLC, Chicago, IL (US)

( * ) Notice: Subject to any disclaimer, the term of this patent is extended or adjusted under 35 U.S.C. 154(b) by 137 days.

(21) Appl. No.: 12/482,443

(22) Filed: Jun. 10, 2009

(65) Prior Publication Data

US 2009/0252000 A1 Oct. 8, 2009

Related U.S. Application Data

(60) Continuation of application No. 11/609,396, filed on Dec. 12, 2006, now Pat. No. 7,561,697, which is a continuation of application No. 10/848,993, filed on May 18, 2004, now Pat. No. 7,154,819, which is a division of application No. 09/799,460, filed on Mar. 5, 2001, now Pat. No. 6,738,318.

(51) Int. Cl.
*G11B 15/52* (2006.01)

(52) U.S. Cl. .................................. 369/47.15; 369/53.44

(58) Field of Classification Search ........................ None
See application file for complete search history.

(56) References Cited

U.S. PATENT DOCUMENTS

| | | | | |
|---|---|---|---|---|
| 4,018,448 | A | | 4/1977 | Di Matteo |
| 4,823,391 | A | | 4/1989 | Schwartz |
| 4,852,176 | A | | 7/1989 | Truhe, Jr. |
| 5,396,562 | A | | 3/1995 | Ishimitsu et al. |
| 5,430,802 | A | | 7/1995 | Page |
| 5,910,990 | A | | 6/1999 | Jang |
| 6,118,876 | A | * | 9/2000 | Ruzicka .......................... 381/18 |
| 6,195,435 | B1 | | 2/2001 | Kitamura |
| 6,608,907 | B1 | | 8/2003 | Lee |
| 6,665,407 | B1 | | 12/2003 | Dicker et al. |
| 6,686,531 | B1 | | 2/2004 | Pennock et al. |

* cited by examiner

*Primary Examiner* — Paul Huber

(74) *Attorney, Agent, or Firm* — Law Office of Scott C. Harris, Inc.

(57) ABSTRACT

Audio is adaptively associated with speakers, depending on the speaker configuration that is present. Each speaker it receives an audio assignment based on its individual spectral characteristics. As more speakers are added, content is adaptively associated with that you speaker, and taken away from the previous.

9 Claims, 2 Drawing Sheets

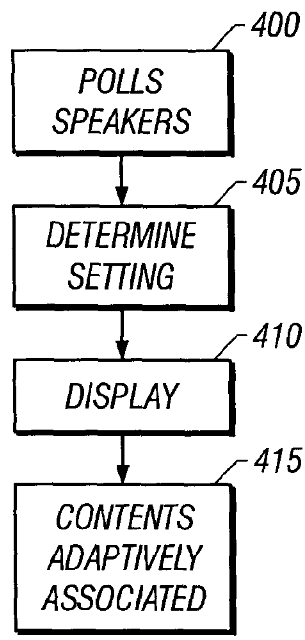
FIG. 4
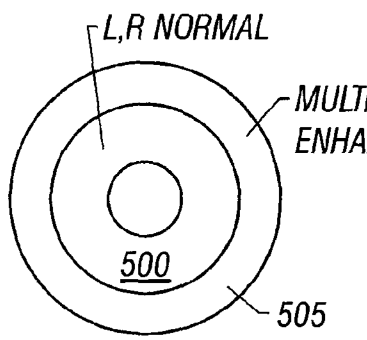
FIG. 5A
ALL MULTI TRACK & INFO IN P,Q HEADERS TELLING CD PLAYER IGNORE PARTS OF THE STREAM
FIG. 5B
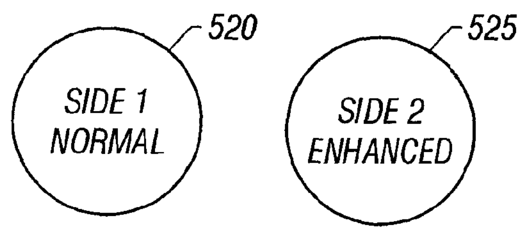
FIG. 5C
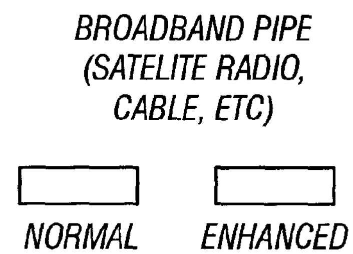
FIG. 5D

ADAPTIVE HIGH FIDELITY REPRODUCTION SYSTEM

This is a continuation of Ser. No. 11/609,396, filed Dec. 12, 2006, now U.S. Pat. No. 7,561,697 which is a continuation of Ser. No. 10/848,993, filed May 18, 2004, now U.S. Pat. No. 7,154,819, which is a division of Ser. No. 09/799,460, filed Mar. 5, 2001, now U.S. Pat. No. 6,738,318, issued Apr. 29, 2004.

BACKGROUND

High fidelity systems attempt to simulate the sound that comes from actual sound-producing objects. Real music is produced when each of a plurality of different instruments, at a different location, produces its own unique sound. Each instrument also has unique sonic tuning characteristics. The real music is produced from these instruments, at different locations, producing sounds. Producing a simulation of this real music is the objective of a high fidelity music reproduction system.

Movies, in contrast, actually have a different objective for their sound production. In the 1980s, movie sound became a format with multiple channels providing the sound output. This format, called surround sound, produced five or more channels of sound. The channels included left and right main channels for stereo music. A center channel was used for mono parts of the reproduction such as the voice. In addition, left and right surround channels were provided for special effects. In addition, additional channels may be provided for sound having special characteristics such as sub woofers. This sound system attempts to produce the feeling of actually being part of the action depicted by the movie.

SUMMARY

The present inventor believes that an ideal musical reproduction, like real music, should produce the sound from a plurality of instruments, each coming from its own tuned source that has tuning/music reproduction characteristics that is most closely representative of the instrument. The current system of stereo reproduction reproduces most, if not all, instruments, from two different sources (speakers), both of which are tuned the same.

According to the present system, information is produced for reproduction by music reproduction hardware. The information as produced has a number of separated parts. That is, each stream of audio information, such as a song, may have separated parts that form that stream. In one embodiment, those parts may be tracks on the audio reproduction medium.

The separated parts are adaptively associated with different music reproduction hardware based on the actual characteristics of the hardware producing the music. That is, for example, the violin sounds may be produced by the speaker most closely tuned to violins. Another speaker, e.g., most closely tuned to horns, may reproduce the horns.

Another aspect automatically determines specific characteristics of the hardware, and forms a file indicative of those specific characteristics of the hardware. The contents of that file is used to adaptively associate the content of the media, e.g., the music, with the hardware.

BRIEF DESCRIPTION OF THE DRAWINGS

These and other aspects of the invention will be described in detail with reference to the accompanying drawings, wherein:

FIG. 4 shows a flowchart of operation;

FIGS. 5A-5D show different ways of storing information for use in the present application.

DETAILED DESCRIPTION

Figure 1:
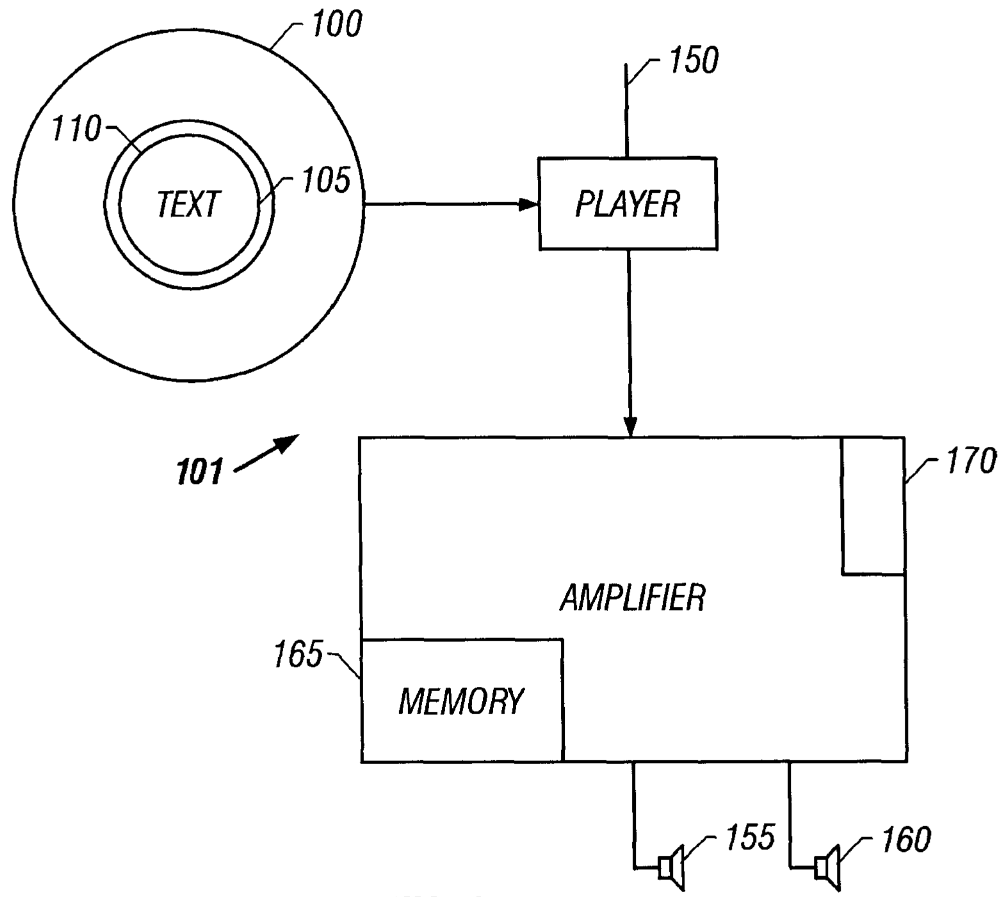
FIG. 1 shows a block diagram of the system.

Modern audio reproduction media may have more space for storing the data that is indicative of the audio. For example, the so-called DVD may have 100 times the storage capability of a standard CD, also known as a "Redbook" format CD. Various enhanced CD formats have also been suggested which provide more data on the media and that can be used to store more information. In addition, modern compression formats, such as the MP3 format, allows reducing the size that is occupied by information placed on the media. Again, this has the effect of allowing the media to store more information.

Broadband channels are also available. For example, satellite radio channels are proposed. Broadband Internet channels have been used. In addition, audio content may also be produced over a cable and the like.

The present system will be described with reference to information being stored on the audio medium. A plurality of tracks are provided on the medium. The tracks each include information about a different aspect of the audio stream that is recorded on the medium. The audio medium is shown here as being a disk, but it could be understood that any different kind of audio containing medium could be used with the system of the present invention.

Each track may represent a specified kind of information. In one aspect, each track includes information about the same kind of instruments. The instruments included on a single track may be of the same time, e.g. all violins, or may have the same spectral characteristics, that is all string instruments, or all producing output within a specified spectral region, or primarily within a specified spectral region. Sounds may be grouped based on spectral characteristics, e.g., by using a fast Fourier transform on recorded sound from the instrument. Each instrument may be characterized on the spectrum, e.g. by forming a histogram indicating that amount of energy in each spectral bucket. Alternatively, instruments or sounds which may effectively compress may be grouped together. The instruments which are sufficiently similar may be grouped together as a track. This has a number of advantages in the context of the present system. First of all, it makes the information on the track more compressible by certain compression systems such as MP3, since each instrument on the track has similar characteristics. In addition, on readout, the track can be accurately reproduced by the same kind of reproduction equipment.

Multiple tracks are placed on the medium for different purposes. For example, a single medium may include movie style tracks such as left, right, center, left surround and right surround, and also a subwoofer setting. The left and right tracks on the medium represent the stereo information. The remaining information in the tracks may represent information from different individual instruments or instrument types. This information may include separate tracks for each of voices, strings, winds, guitar, percussion, bass strings, and bass winds, with the understanding that a each different instrument may also be broken up based on its characteristics e.g. bass or treble. The above has described 13 tracks for each stored item of information. It should be understood, however, that there may be fewer or more tracks, e.g. up to 20 tracks. Since each track may represent information of the specified instrument type, the information in the track may be highly compressible.

As can be seen from the above, the medium will typically include more information that is necessary to actually playback the audio on any system. For example, the medium may include stereo left and stereo right channels. However, on some systems, 10 speakers may be provided for different instrument types, and this information includes parts of the information that is also within the left and right stereo. If the separated channels are used, the audio left and audio right information might not be used. Therefore, the audio medium may include redundant information. Adaptive decisions are made during playback indicating which speakers and or which music reproduction equipment gets which content.

An embodiment is shown in FIG. 1. A disk 100 includes a plurality of tracks of information. For example, if the tracks above are used, the stream, shown as 110, may include 13 different channels. The medium may also include control track 105 which may be a data track including information about which tracks on the medium include which information.

The medium is read out by a player. The contents of the medium is interpreted by the adaptive element that is either in the player, or in a controller or amplifier associated with the player. The adaptive element is shown herein as 150, and as being part of the amplifier.

The amplifier is connected to a plurality of different speakers or different amplified speakers. Each speaker system, such as 155, has specified spectral and/or other sound producing characteristics. In an embodiment, each speaker may also be active, in the sense that it includes an electronic module associated with the speaker. That electronic module allows communication with the speaker, and may include information about the speaker's characteristics. In another embodiment, characteristics of the speakers may be obtained in a different way.

The characteristics of the speaker may be communicated to the memory 165 over the speaker wire using serial formats such as universal serial bus, or RS 232 for example. Alternatively, the amplifier 150 may include a medium reading capability shown as 170. This reading capability may read a storage medium, such as a floppy disk, memory stick, CD, or mini CD which is inserted therein. The medium includes information about the speakers, which is then read from the medium, and stored in the memory. Another way of communicating information is to obtain characteristics from a public network such as the Internet.

In another aspect, each speaker that is purchased is provided with an audio medium such as a CD or DVD. That audio medium is intended to be played in the CD player associated with the stereo. The contents of the CD are played as normal CD audio. However, electronic information about the speakers is encoded in the CD audio. Thus, this includes a specified code that can be read by the amplifier 150, and indicates that speaker information follows. The following information includes speaker information.

The main amplifier 150 includes also a processor 170 which makes adaptive decisions about which speakers will be selected to play each track or channel on the medium. This adaptive decision will be based on the specific characteristics of the speakers, and the specific characteristics of the audio. The decision is based on, of course, the specific hardware which is present in the system. More hardware, actually more speakers, in the system, will enable better sound. When fewer speakers are present, tracks will need to be combined. In the minimum configuration, only two speakers are present, and the standard stereo is played. Each time a speaker is added, it receives multiple tracks assigned to be played to it, based on its spectral characteristics. This enables the user to make purchases based on their preferences. The user who likes the sound of strings, for example, may purchase a speaker that is tuned to strings. When this speaker is added to the amplifier system 150, its characteristics are stored in memory 165. Playing of media will thereafter assign information from the media 100 to those speakers, based on the speakers characteristics. Conversely, other speakers for horns, and other instruments may also be purchased. Each speaker is adaptively associated with the content for those speakers. Each extra speaker is assigned with sound, and that sound is hence not played by the other speakers. Therefore, more speakers allow better reproduction of the sound.

Figure 2:
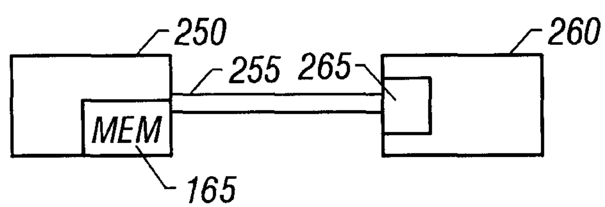
FIG. 2 shows a wired connection between amplifier and speaker.

Different ways of getting the information into the memory are also considered. FIG. 2 illustrates up plug and play type operation of doing this. In FIG. 2, the amplifier 250 is connected via a standard line connection to the speaker 260. The speaker 260 includes an electronics module therein 265. The module 265 communicates with a corresponding module in the amplifier, using any serial protocol but preferably Ethernet, USB, or RS 232. Any protocol that may communicate over a 2 wire line may be used. In this embodiment, the amplifier may poll the speaker using a low voltage level signal. Since the signal is at a low voltage level, it will produce little if any sound out of the speaker. However, the electronics module 265 within the speaker may still recognize this as control signals. The speaker responds with information indicative of its individual spectral characteristics. This information is then stored in the memory 165 within the amplifier. The information may also be used in the playback mode, to determine channel allocations for the information from the media.

Figure 3:
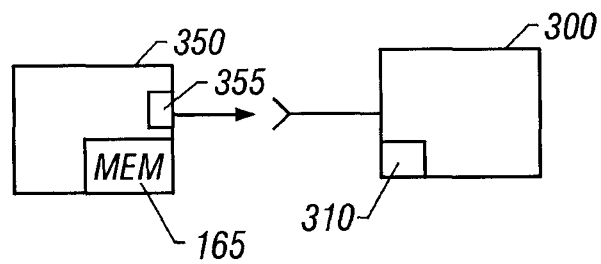
FIG. 3 shows a wireless connection.

A wireless alternative is shown in FIG. 3. This may use wireless formats such as bluetooth, wireless LAN, or some other wireless format. FIG. 3 shows a bluetooth module 310 in the speaker 300. The amplifier 350 also includes a bluetooth module shown as 355. Again, this system may operate by polling. The speaker may respond to a poll with information indicative of the speaker's individual characteristics. This information is then stored in the memory 165.

In any of these embodiments, the user can purchase more speakers at any time. Settings for the music are automatically determined by the characteristics of the speaker.

The above-described operations may operate according to the flowchart of FIG. 4, which may run in the processor 170.

At 400, the system polls all speakers. This may be carried out at each time of power on, or may be carried out only once for example on initial connection. The speakers may also include the capability of determining room acoustics, in which case it may be desirable to poll the speakers at each power up, or at time intervals.

At 405, the system determines settings based on the polling. These settings may optionally be displayed at 410. At 415, the content of the tracks is adaptively associated with the user's individual stereo setup.

The above has described the information stored on the medium. This "enhanced" information may be stored on the media in a number of different ways.

FIG. 5A shows the medium being a disk with a first portion that has normal CD stereo 500, that can be read by any CD player, and reproduced through normal stereo equipment. A second, enhanced portion of the disk 505 includes multitrack enhanced information. Since the first portion is then typical CD form, this setup will require that the medium have additional space available. An advantage of this system is that the medium can be read on any standard CD player.

FIG. 5B shows another system in which the entire medium is stored in multitrack format. In this system, the standard stereo information is interleaved with other tracks of additional information. Standard CD format includes headers that are specified by the standard. These headers include information such as P and Q parts. These headers include signals that instruct a standard CD player to ignore certain parts of the data stream that is stored on the disk; those parts being reproduced only by enhanced players. For example, CDs may include capability of quad reproduction, and the enhanced information tracks could be labeled as quad, so that a standard player ignores this information.

FIG. 5C shows another alternative in which a dual cited disk has a first side 520 representing normal information and a second side 525 which is an enhanced disk.

While the above has described the information being present on the disk, it should be understood that other forms of reproduction and obtaining of information are possible. All such forms are intended to be encompassed.

Other embodiments are within the disclosed invention.

What is claimed is:

1. An audio reproducing element, comprising:
- an audio reproducing element including audio reproducing hardware in a housing, said housing including first connections which receive audio information to be played by said audio reproducing element, and an electronic module, in said housing which stores information about specific characteristics of said audio reproducing hardware as stored hardware specific information, and which provides output information indicative of said stored hardware specific information responsive to a remote request.

2. An audio reproducing element as in claim 1, wherein said stored hardware specific is spectral characteristics of the audio reproducing hardware.

3. An audio reproducing element as in claim 1, wherein said audio reproducing hardware includes at least one speaker.

4. An audio reproducing element as in claim 1, further comprising an information transferring part, which operates to transfer said stored hardware specific information to a requesting unit, said stored hardware specific information transferred by said information transferring part being indicative of said stored hardware specific information from said electronic module within said audio reproducing element, and wherein said information transferring part transfers the information over a separate wired connection, that is separate from the connection that receives the audio information.

5. An audio reproducing element as in claim 1, further comprising an information transferring part, which operates to transfer information to a requesting unit, said information transferred by said information transferring part being indicative of said stored hardware specific information from said electronic module within said audio reproducing element, and wherein said information transferring part transfers the information wirelessly to the requesting unit.

6. The audio reproducing element as in claim 1, wherein said stored hardware specific information includes information about an optimum musical type to be played by said audio reproducing hardware.

7. An audio reproducing element, comprising:
- an audio reproducing device which receives audio to be played and produces outputs indicative of said audio to be played, said outputs indicative of said audio to be played by remote audio reproducing elements with speaker hardware therein,
- said audio reproducing device also receiving hardware specific information indicative of multiple of said remote audio reproducing elements with speaker hardware therein that will receive said audio information, and said audio reproducing device determining which of said audio reproducing elements will receive different parts of said audio to be played based on said hardware specific information,
- wherein said audio reproducing device receives said hardware specific information from an internet connection.

8. The audio reproducing element of claim 7, wherein said audio reproducing device receives said hardware specific information from said remote audio reproducing element.

9. An audio reproducing element as in claim 7, wherein said hardware specific information includes information about an optimum musical type to be played by said audio reproducing hardware.

* * * * *